United States Patent
Mochizuki et al.

(10) Patent No.: US 8,106,122 B2
(45) Date of Patent: Jan. 31, 2012

(54) PROPYLENE-BASED POLYMER COMPOSITION FOR ADHESIVE USE AND LAMINATE THEREOF

(75) Inventors: Hideki Mochizuki, Dusseldorf (DE); Shigeyuki Yasui, Rye Brook, NY (US); Seiji Ota, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 683 days.

(21) Appl. No.: 11/887,567

(22) PCT Filed: Mar. 24, 2006

(86) PCT No.: PCT/JP2006/306018
§ 371 (c)(1),
(2), (4) Date: Sep. 28, 2007

(87) PCT Pub. No.: WO2006/104058
PCT Pub. Date: Oct. 5, 2006

(65) Prior Publication Data
US 2009/0275700 A1 Nov. 5, 2009

(30) Foreign Application Priority Data
Mar. 29, 2005 (JP) .................. 2005-096468

(51) Int. Cl.
C08L 51/06 (2006.01)
C08L 53/00 (2006.01)
(52) U.S. Cl. .............................. 525/71; 428/523
(58) Field of Classification Search .............. 525/71; 428/523
See application file for complete search history.

(56) References Cited

U.S. PATENT DOCUMENTS

| H568 H | * | 1/1989 | Tanaka et al. ............... 525/71 |
| 4,863,995 A | * | 9/1989 | Murakami et al. .......... 525/74 |
| 5,708,083 A | * | 1/1998 | Kawamura et al. ......... 525/89 |
| 2002/0077406 A1 | | 6/2002 | Yu et al. |
| 2005/0209387 A1 | * | 9/2005 | Doi et al. .................. 524/451 |

FOREIGN PATENT DOCUMENTS

| EP | 0 462 680 | 12/1991 |
| EP | 1 580 230 | 9/2005 |
| JP | 61-062544 | 3/1986 |
| JP | 63-97655 | * 4/1988 |
| JP | 08-041276 | 2/1996 |
| JP | 10-060128 | 3/1998 |
| JP | 2001-082249 | 4/2001 |
| JP | 2001-294836 | 10/2001 |
| JP | 2003-231793 | 8/2003 |
| JP | 2005-068420 | 3/2005 |

OTHER PUBLICATIONS

Abe et al., STN AN 1988:571658, abstracting JP 63-097655 (Apr. 1988).*

* cited by examiner

*Primary Examiner* — Jeffrey Mullis
(74) *Attorney, Agent, or Firm* — Foley & Lardner LLP

(57) ABSTRACT

A propylene-based polymer composition for adhesive use and a laminate structure thereof are provided, wherein decrease of bonding strength is prevented when the laminate structure is formed and heat treatment is applied and whitening in bending process is suppressed. Provided are a propylene-based polymer composition (D) for adhesive use comprising (i) 40 to 92 wt % of a graft-modified polypropylene (A); (ii) 5 to 30 wt % of an ethylene.α-olefin copolymer (B) having a melt flow rate (MFR) of 0.01 to 10 g/10 min at 230° C. under a load of 2.16 kg and a density of 0.940 g/cm³ or less; and (iii) 3 to 30 wt % of a block copolymer (C) composed of an olefin crystalline segment and an ethylene.α-olefin segment, wherein the sum of (A), (B) and (C) is 100 wt %, and a laminate comprising at least one layer of the propylene-based polymer composition for adhesive use.

4 Claims, No Drawings

PROPYLENE-BASED POLYMER COMPOSITION FOR ADHESIVE USE AND LAMINATE THEREOF

TECHNICAL FIELD

The present invention relates to a propylene-based polymer composition for adhesive use and a laminate using it. More specifically, the present invention relates to a propylene-based polymer composition for adhesive use and to a laminate structure using the polymer composition, wherein decrease of bonding strength which occurs when the laminate structure is molded and heat treated can be suppressed, and whitening caused in bending process can be also suppressed.

BACKGROUND ART

Polypropylene resins have excellent mechanical strength, rigidity, heat resistance, chemical resistance, oil resistance, transparency, low temperature impact strength and the like. Utilizing these characteristics, they are widely used as packaging and covering materials such as film, sheet and bottle, or ornament materials such as wallpaper. However, since such polypropylene resins have high permeability of gas such as oxygen, they were not used as a packaging material for food, medicine, cosmetics and the like, where high gas barrier property is required. Therefore, in order to improve the gas barrier property of a polypropylene resin, a method of laminating the polypropylene resin with a resin having better gas barrier property than the polypropylene resin such as a saponified ethylene.vinyl acetate copolymer has been proposed. In this case, however, as adhesiveness of polypropylene with the saponified olefin.vinyl acetate copolymer (hereinafter called EVOH) is very poor, various adhesive resins such as ionomer, ethylene.vinyl acetate copolymer, and graft-modified carboxylic acid are co-extruded to obtain a laminate structure (Patent Document 1).

However, when such a laminate structure is filled with a content at high temperature, or heat treated thereafter, delamination of EVOH and the adhesive resin takes place in such occasions as secondary processing, dropping or bending due to expansion and shrinkage. Furthermore, whitening due to bending may occur, leading to unsatisfactory performance (such as strength) or appearance of the product. Moreover, the EVOH layer tends to develop cracks due to delamination of EVOH and the adhesive resin layer, which may cause deterioration of barrier property.

In the case of ornament materials such as wallpaper, peeling of the adhesive resin layer from a base material (resin film, metal) may occur under an environment of repeated heating and cooling, which may spoil the appearance.

[Patent Document 1] Japanese Patent Laid-open Publication No. 2001-88249

DISCLOSURE OF THE INVENTION

Problems to be Solved by the Invention

An object of the present invention is to provide a propylene-based polymer composition for adhesive use and a laminate using it, in which decrease of bonding strength which occurs when the laminate structure is molded and heat treated can be prevented, and moreover, whitening in bending process can be suppressed.

Means for Solving the Problems

The inventors of the present invention, as a result of extensive research, found that, by using a specific composition, a propylene-based polymer composition for adhesive use can be obtained in which decrease of bonding strength can be prevented when heat treatment is applied, and whitening in bending process can be suppressed, and thus accomplished the present invention.

That is to say, the present invention provides a propylene-based polymer composition (D) for adhesive use comprising:
(i) 40 to 92 wt % of graft-modified polypropylene (A),
(ii) 5 to 30 wt % of ethylene.α-olefin copolymer (B) having a melt flow rate (MFR) of 0.01 to 10 g/10 min at 230° C. under a load of 2.16 kg and a density of 0.940 g/cm$^3$ or less, and
(iii) 3 to 30 wt % of block copolymer (C) composed of an olefin crystalline segment and an ethylene.α-olefin segment (where the sum of (A), (B) and (C) is 100 wt %);
and a laminate containing at least one layer of the above-mentioned propylene-based polymer composition for adhesive use.

Effect of the Invention

Propylene-based polymer composition (D) for adhesive use of the present invention is a composition in which decrease of bonding strength can be prevented when heat treatment is applied, and whitening in bending process can be suppressed. Namely, by using propylene-based polymer composition (D) for adhesive use of the present invention, it becomes possible to obtain a molded article which can prevent decrease of bonding strength when heat treatment is applied, and can suppress whitening in bending process.

BEST MODE FOR CARRYING OUT THE INVENTION

The present invention will be explained in more detail below.

Explanation will be given in the following on each component of propylene-based polymer composition (D) for adhesive use which contains 40 to 92 wt % of graft-modified polypropylene (A); 5 to 30 wt % of ethylene.α-olefin copolymer (B) having a melt flow rate (MFR) of 0.01 to 10 g/10 min at 230° C. under a load of 2.16 kg and a density of 0.940 g/cm$^3$ or less; and 3 to 30 wt % of block copolymer (C) composed of an olefin crystalline segment and an ethylene.α-olefin segment (where the sum of (A), (B) and (C) is 100 wt %).

Graft-Modified Polypropylene (A)

The graft-modified polypropylene (A) used in the present invention is a polypropylene modified by grafting with an unsaturated carboxylic acid and/or its derivative.

The polypropylene used for graft modification is a homopolymer of propylene and/or a copolymer of propylene and an α-olefin. Ethylene and/or an α-olefin having 4 to 20 carbon atoms are used as the α-olefin in the propylene.α-olefin copolymer, and these α-olefins may be used alone or in a combination of two or more kinds. In the present invention, an α-olefin having 4 to 10 carbon atoms is preferable, of which an α-olefin having 4 to 8 carbon atoms is used particularly preferably.

The production method of a polypropylene used for graft modification in the present invention is not particularly limited, and the polypropylene may be produced by using a well-known catalyst such as Ziegler-Natta catalyst or a metallocene catalyst in a well-known process. Also, a crystalline polymer is preferably used. In the case of a copolymer, it can be either a random copolymer or a block copolymer. Furthermore, there is no particular limitation as to stereospecificity or the molecular weight as long as the polypropylene satisfies moldability and has strength sufficient for use when formed into a molded article. A commercially available resin may be also used as it is.

A preferable polypropylene used in the present invention is a homopolypropylene or a random propylene.α-olefin copolymer. Furthermore, a number of different polypropylenes may be used as a mixture.

A melt flow rate (MFR) of the graft-modified polypropylene (A) used in the present invention is normally 0.01 to 400 g/10 min, preferably 0.1 to 90 g/10 min measured according to ASTM D1238 at 230° C. under a load of 2.16 kg. The graft-modified polypropylene (A) with an MFR in the above range is excellent in fluidity and can provide propylene-based polymer composition (D) for adhesive use capable of molding a large-sized article and high-speed molding.

Examples of the unsaturated carboxylic acid and/or its derivative used for the graft monomer include an unsaturated compound having one or more carboxyl groups, an ester of a compound having carboxyl group(s) and an alkyl alcohol, or an unsaturated compound having one or more carboxylic anhydride groups. Examples of the unsaturated group include vinyl group, vinylene group, unsaturated cyclic hydrocarbon group and the like. Specific compounds include unsaturated carboxylic acids such as acrylic acid, maleic acid, fumaric acid, tetrahydrophthalic acid, itaconic acid, citraconic acid, crotonic acid, isocrotonic acid, nadic acid [trade mark] (endo-cis-bicyclo[2.2.1]hept-5-ene-2,3-dicarboxylic acid); or their derivatives such as acyl halide, amide, imide, anhydride, ester and the like. Specific examples of such derivatives include malenyl chloride, maleimide, maleic anhydride, citraconic anhydride, monomethyl maleate, dimethyl maleate, glycidyl maleate and the like. These unsaturated carboxylic acids and/or derivatives thereof may be used alone or in a combination of two or more kinds. Among the above compounds, an unsaturated dicarboxylic acid or its acid anhydride is preferably used. Maleic acid, nadic acid or acid anhydride thereof is used particularly preferably. The content of the unsaturated carboxylic acid and/or its derivative can be easily controlled, for example, by suitable selection of grafting conditions.

The method of grafting a graft monomer selected from the unsaturated carboxylic acid and/or its derivative is not particularly limited, and a well-known graft polymerization method such as a solvent method or a melt kneading method may be employed. For example, a method of performing graft reaction by adding a graft monomer to a molten polymer, or a method of performing graft reaction by dissolving a polymer in a solvent to make a solution to which a graft monomer is added may be employed.

The content of the unsaturated carboxylic acid and/or its derivative in graft-modified polypropylene (A) used in the present invention is normally 0.01 to 5 wt %, preferably 0.01 to 3 wt %, more preferably 0.01 to 1 wt % per 100 wt % of graft-modified polypropylene (A).

Ethylene.α-Olefin Copolymer (B)

Ethylene.α-olefin copolymer (B) used in the present invention has a melt flow rate (measured according to ASTM D1238 at 230° C. under a load of 2.16 kg) of 0.01 to 10 g/10 min, and a density of 0.940 g/cm$^3$ or less. Ethylene.α-olefin copolymer (B) is preferably a random copolymer of ethylene and an α-olefin having 3 to 20 carbon atoms, of which an α-olefin having 3 or 4 carbon atoms is preferable. Namely, an ethylene.propylene random copolymer is preferable as ethylene.α-olefin copolymer (B).

Ethylene.α-olefin copolymer (B) has preferably 55 to 95 wt %, more preferably 60 to 90 wt % of polymer units derived from ethylene.

The melt flow rate of the above ethylene.α-olefin copolymer (B) is preferably 0.01 to 10 g/10 min and the density is preferably 0.85 to 0.90 g/cm$^3$.

Ethylene.α-olefin copolymer (B) having such physical properties is normally amorphous or low crystalline having a crystallinity of less than 40%.

Furthermore, the ethylene.α-olefin copolymer (B) used in the present invention may be grafted with a small amount of maleic anhydride and the like as long as the above conditions are satisfied. Moreover, after grafting a small amount of maleic anhydride and the like, the grafted monomer may be further modified with a diamine and the like as long as the above conditions are satisfied. In addition, even if the grafted polymer or the polymer modified with diamine and the like may not satisfy the above conditions, ethylene.α-olefin copolymer (B) as a whole satisfying above conditions may be acceptable.

Block Copolymer (C) Composed of an Olefin Crystalline Segment and an Ethylene.α-Olefin Segment Block copolymer (C) used in the present invention composed of an olefin crystalline segment and an ethylene.α-olefin segment is selected from those which improve compatibility between a graft-modified polypropylene (A) phase and an ethylene.α-olefin copolymer (B) phase and are effective in reducing inter-phase delamination on a matrix level. Basically, the olefin crystalline segment contributes to compatibility with the graft-modified polypropylene (A) phase, while the ethylene.α-olefin segment contributes to compatibility with the ethylene-α-olefin copolymer (B) phase. As a result, whitening of an adhesive layer is effectively prevented.

Structural units of the olefin crystalline segment in block copolymer (C) of the present invention which is composed of an olefin crystalline segment and an ethylene.α-olefin segment are ethylene, propylene and the like, of which particularly ethylene is preferable. In this case, an α-olefin having 3 to 20 carbon atoms may be contained therein to an extent in which crystallinity is not damaged. Moreover, a conjugated diene compound may be contained wholly or partly, wherein hydrogenation after polymerization allows making the structure similar to an ethylene polymer. 1,3-Butadiene is particularly preferable as such a conjugated diene. The molecular weight, molecular weight distribution or density of the segment is not particularly limited.

For the ethylene.α-olefin segment in block copolymer (C), a segment in which ethylene and an α-olefin are aligned randomly is preferable. The α-olefin as a structural unit of the ethylene.α-olefin segment is preferably an α-olefin having 3 to 20 carbon atoms, of which propylene, butene, isobutene, pentene, isopentene, methylpentene, hexene, heptene, octene and the like are particularly preferable. Moreover, a conjugated diene compound may be contained wholly or partly, wherein hydrogenation after polymerization allows forming a structure similar to an ethylene.α-olefin copolymer. Examples of the conjugated diene compound include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene and the like, of which 1,3-butadiene, isoprene and 1,3-pentadiene are preferable, and particularly 1,3-butadiene is preferable. In the case of using a conjugated diene compound, saturation by hydrogenation of 80% or more, preferably 90% or more of the whole double bonds present before hydrogenation is preferable. The molecular weight, molecular weight distribution or density is not particularly limited.

The production method of block copolymer (C) composed of an olefin crystalline segment and an ethylene.α-olefin segment is not particularly limited, and a well-known method may be employed. For example, a production method by living polymerization, a production method of performing hydrogenation of the product of the living polymerization, a stepwise production method using same catalyst and others may be listed. The catalyst used for such production methods is not particularly limited, and any of a Ziegler-Natta-based catalyst, a metallocene-based catalyst and the like may be used, with a cocatalyst and the like if necessary.

Although the number of blocks in the segment is not particularly limited, a block copolymer of a terpolymer or more is preferable. Also, each block may be connected through a coupling agent. Particularly preferable is a hydrogenated product of an olefin-based block terpolymer synthesized by living polymerization. In an olefin crystalline-ethylene.butylene-olefin crystalline block copolymer, crystalline parts constitute physical crosslinking (domain) to form bridging points, and an intermediate rubber block provides rubber elasticity to the product. Moreover, by having olefin crystalline blocks at both ends of the chain, particularly homogeneous three-dimensional network structure may be obtained.

The melt flow rate (MFR) of block copolymer (C) composed of an olefin crystalline segment and an ethylene.α-olefin segment at 230° C. under a load of 2.16 kg is preferably 0.01 to 10 g/10 min.

Propylene-Based Polymer Composition (D) for Adhesive Use

Propylene-based polymer composition (D) for adhesive use of the present invention is characterized by comprising the above-mentioned graft-modified polypropylene (A), ethylene.α-olefin copolymer (B), and olefin crystalline-ethylene.α-olefin block copolymer (C).

Furthermore, propylene-based polymer composition (D) for adhesive use of the present invention may be compounded with other resins, elastomers and the like within the range in which the object of the present invention is not impaired. Compounding with other resins and the like may be conducted at the same time with the above (A), (B), (C), or after propylene-based polymer composition (D) for adhesive use is obtained.

Furthermore, the well-known additives such as a process stabilizer, thermal stabilizer, anti-aging agent, filler or the like may be added to propylene-based polymer composition (D) for adhesive use of the present invention within the range in which the object of the present invention is not impaired. In the present invention, compounding a so-called tackifier is preferable for the purpose of providing tackiness. Examples of the tackifier include rosin derivative, terpene resin, petroleum resin and their hydrides, of which hydrogenated terpene resin and hydrogenated petroleum resin are preferable. The tackifier is preferably compounded in a ratio of 5 to 30 wt % per 70 to 95 wt % of propylene-based polymer composition (D) for adhesive use.

Furthermore, in propylene-based polymer composition (D) for adhesive use of the present invention, compounding with a high-pressure low-density polyethylene is preferable within the range not impairing the object of the present invention, for the purpose of providing high-speed moldability. The high-pressure low-density polyethylene is preferably compounded in a ratio of 3 to 20 wt % per 80 to 97 wt % of propylene-based polymer composition (D) for adhesive use.

Laminate

Propylene-based polymer composition (D) for adhesive use of the present invention is suitably used as an adhesive layer of a laminate. For resins of other thermoplastic resin layers constituting the laminate, various thermoplastic resins such as polyolefin, polyamide, ethylene.vinyl alcohol copolymer and base materials coated with a urethane-based adhesive or metals may be used.

For the ethylene.vinyl alcohol copolymer, a copolymer containing 20 to 50 mol %, preferably 25 to 48 mol % of polymer units derived from ethylene is preferable. It may be produced by saponification of a corresponding ethylene.vinyl acetate copolymer using a conventional method.

The laminate of the present invention may be produced by various well-known methods such as inflation molding, cast molding and tube molding, and well-known co-extrusion methods such as extrusion coating molding and the like. Furthermore, there may be used a method in which dry lamination is performed by heating after molding monolayer or multilayer films.

EXAMPLES

In the following, the present invention is explained in more detail with reference to Examples and Comparative Examples. However, the present invention is in no way restricted by these Examples, as long as they are within the scope of the present invention.

Resins used in Examples and Comparative Examples are shown in the following. All of them were produced by the conventional methods unless otherwise indicated.

PP-1: Maleic anhydride graft-modified ethylene.propylene random copolymer (A)

(the amount of maleic anhydride grafted=0.22 wt % MFR at 230° C. under a load of 2.16 kg: 11 g/10 min, density: 0.90 g/cm$^3$)

PE-1: Ethylene.propylene copolymer (B)

(MFR at 230° C. under a load of 2.16 kg: 0.4 g/10 min, density: 0.87 g/cm$^3$)

PE-2: Ethylene.hexene copolymer (B)

(MFR at 230° C. under a load of 2.16 kg: 4.0 g/10 min, density: 0.92 g/cm$^3$)

PE-3: Ethylene.butene copolymer (B)

(MFR at 230° C. under a load of 2.16 kg: 2.0 g/10 min, density: 0.95 g/cm$^3$)

CEBC-1: Olefin crystalline-ethylene.butylene-olefin crystalline block copolymer (C)

(Trade name DYNARON 6200P, produced by JSR Corporation. MFR at 230° C. under a load of 2.16 kg: 2.5 g/10 min, density: 0.88 g/cm$^3$)

EVOH: Ethylene.vinyl alcohol copolymer (Trade name EVAL F101A, produced by KURARAY Co., Ltd. MFR at 190° C. under a load of 2.16 kg: 1.6 g/10 min, density: 1.190 g/cm$^3$, ethylene ratio in the copolymer 32 mol %)

Example 1

Production of Propylene-Based Polymer Composition (D) for Adhesive Use (A) 75 wt % of maleic anhydride graft-modified ethylene.propylene random copolymer (PP-1) having an MFR of 11 g/10 min and a density of 0.90 g/cm$^3$, (B) 20 wt % of ethylene.propylene copolymer (PE-1) having an MFR of 0.4 g/10 min and a density of 0.87 g/cm$^3$, and (C) 5 wt % of olefin crystalline-ethylene.butylene-olefin crystalline block copolymer (CEBC-1) having an MFR of 2.5 g/10 min and a density of 0.88 g/cm$^3$ were melt-kneaded at 230° C. using a single screw extruder to obtain a propylene-based polymer composition (D) for adhesive use. The MFR of the obtained propylene-based polymer composition (D) for adhesive use was 7.5 g/10 min and the density was 0.90 g/cm$^3$.

<Bonding Strength with Ethylene.Vinyl Alcohol Copolymer (EVOH)>

A three-layer film (film-1) was molded using a co-extruder under the conditions shown below. Inter-layer bonding strength (peeling strength) between the EVOH layer and the adhesive layer comprising the propylene-based polymer composition (D) for adhesive use in the obtained three layer film was measured by conducting a T type peeling test at a peeling speed of 300 mm/min before and after heat treatment at 90° C. for 24 hours.

[Molding Conditions]
Outside layer/middle layer/inside layer=40/40/160 μm
Outside layer: EVOH
Middle layer: propylene-based polymer composition (D) for adhesive use
Inside layer: High pressure LDPE
T-die extruder: die diameter 40 mmφ extruder (outside layer)
Preset temperature: 220° C.
Die diameter: 40 mmφ extruder (middle layer)
Preset temperature: 220° C.
Die diameter: 40 mmφ extruder (inside layer)
Preset temperature: 220° C.
Molding speed: 5 m/min <Whitening Elongation>

Propylene-based Polymer composition (D) for adhesive use was press molded under the conditions shown below, and subjected to a tensile test with a speed of 200 mm/min to determine the tensile elongation at which whitening starts.

[Molding Conditions]
Propylene-based polymer composition (D) for adhesive use=100 μm
T-die extruder: die diameter 40 mmφ extruder
Preset temperature: 220° C.
Molding speed: 10 m/min

Examples 2-3, Comparative Examples 1-3

Polymer composition (D) for adhesive use was produced in the same manner as in Example 1, and except that the components of propylene-based polymer composition (D) for adhesive use composing the middle layer was changed as shown in Table 1, three layer laminates were molded. Physical properties of the obtained propylene-based polymer composition (D) for adhesive use and results of measurement and evaluation of the laminate are shown in Table 1.

TABLE 1

| | | Example 1 | Example 2 | Example 3 | Comparative Example 1 | Comparative Example 2 | Comparative Example 3 |
|---|---|---|---|---|---|---|---|
| Resin composition | PP-1 | 75 | 70 | 70 | 70 | 75 | 75 |
| | PE-1 | 20 | 20 | | | 25 | |
| | PE-2 | | | 20 | | | |
| | PE-3 | | | | 20 | | |
| | CEBC-1 | 5 | 10 | 5 | 10 | | 25 |
| MFR (g/10 min, 230° C.) | | 7.5 | 7.9 | 8 | 8 | 5.6 | 7.6 |
| Density (kg/m$^3$) | | 0.9 | 0.89 | 0.89 | 0.9 | 0.9 | 0.9 |
| Bonded layer | | EVOH | EVOH | EVOH | EVOH | EVOH | EVOH |
| Initial bonding strength (N/15 mm) | | 20 | 20 | 18 | 12 | 20 | 10 |
| Bonding strength after heat treatment (N/15 mm) | | 13 | 14 | 14 | 5 | 10 | 6 |
| Whitening elongation | | 200 | 220 | 200 | 50 | 100 | 300 |

INDUSTRIAL APPLICABILITY

The present invention provides a propylene-based polymer composition for adhesive use in which decrease of bonding strength is suppressed when heat treatment is applied, and whitening in bending process is suppressed. By using this composition, a laminate can be obtained in which decrease of bonding strength is suppressed when heat treatment is applied, and whitening in bending process is suppressed. Although the use of the laminate of the present invention is not particularly limited, molding to film, for example, is desirable. The laminate structure molded to film shape is used, for example, by processing it to food packaging film, sheet, bottle and ornament materials such as wallpaper.

The invention claimed is:

1. A propylene-based polymer composition (D) for adhesive use comprising:
   (i) 40 to 92 wt % of a graft-modified polypropylene (A);
   (ii) 5 to 30 wt % of an ethylene.α-olefin copolymer (B) having a melt flow rate (MFR) of 0.01 to 10 g/10 min at 230° C. under a load of 2.16 kg and a density of 0.940 g/cm$^3$ or less; and
   (iii) 3 to 30 wt % of an ethylene-ethylene.butylene-ethylene block copolymer (C); wherein the sum of (A), (B) and (C) is 100 wt %.

2. The propylene-based polymer composition (D) for adhesive use according to claim 1, wherein the graft-modified polypropylene (A) comprises 0.01 to 5 wt % of an unsaturated carboxylic acid and/or its derivative per 100 wt % of graft-modified polypropylene (A).

3. The propylene-based polymer composition (D) for adhesive use according to claim 1, further comprising a high-pressure low-density polyethylene.

4. A laminate comprising at least one layer of the propylene-based polymer composition for adhesive use according to claim 1.

* * * * *